Patented Oct. 14, 1924.

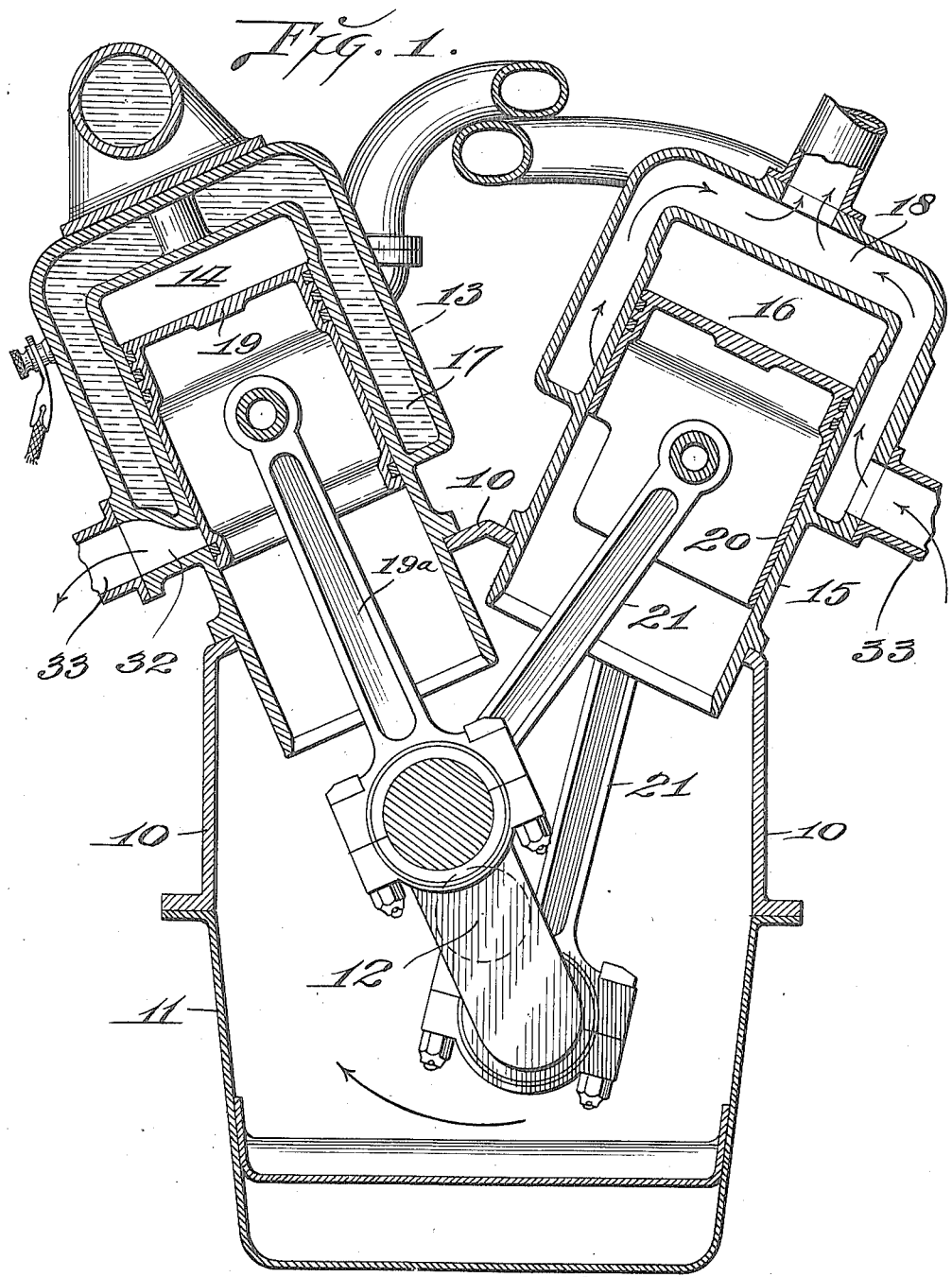

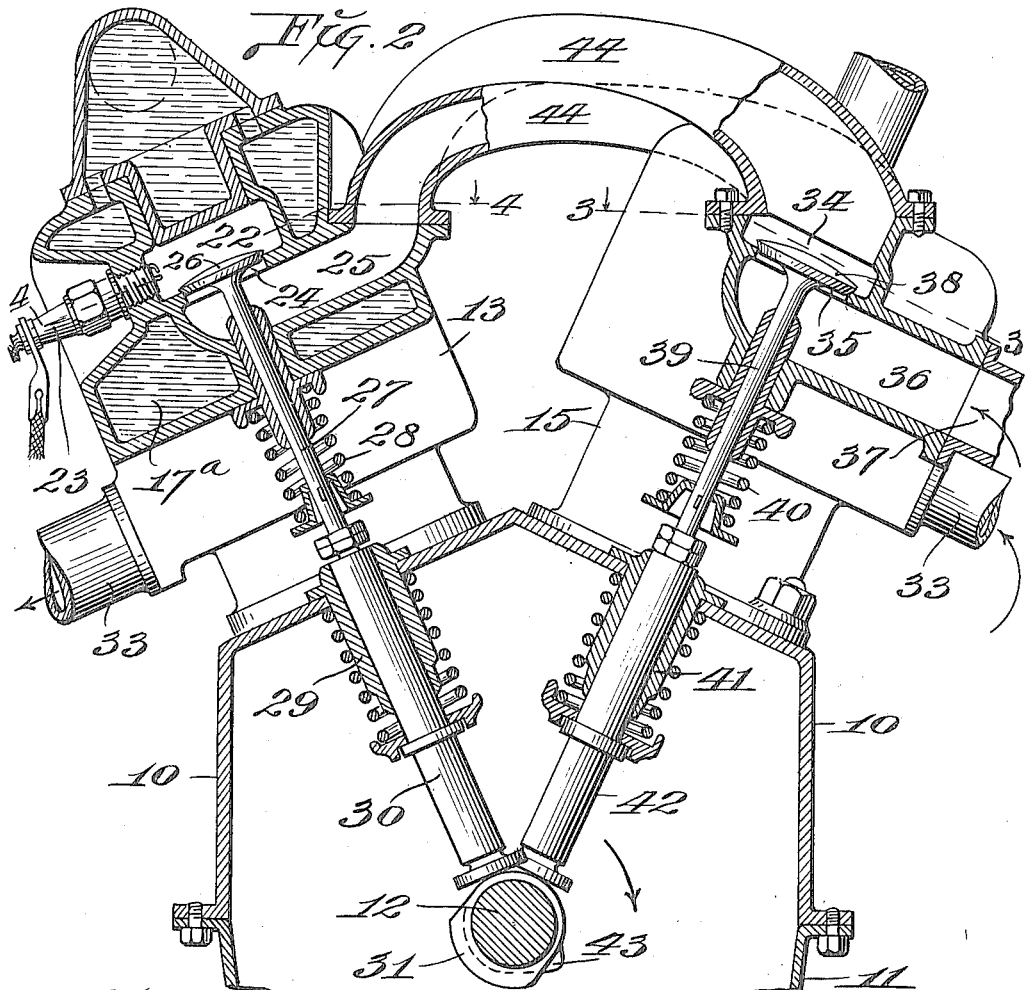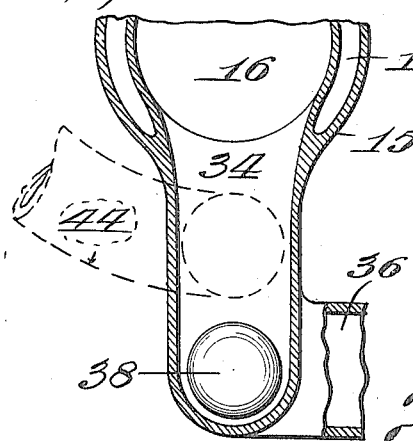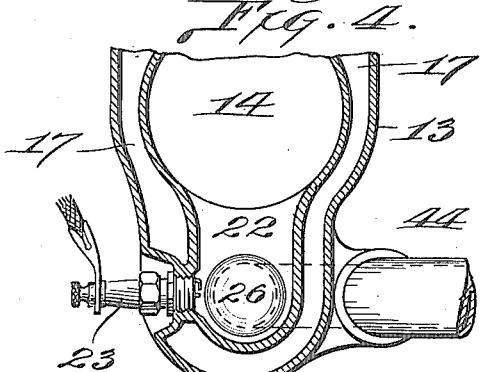

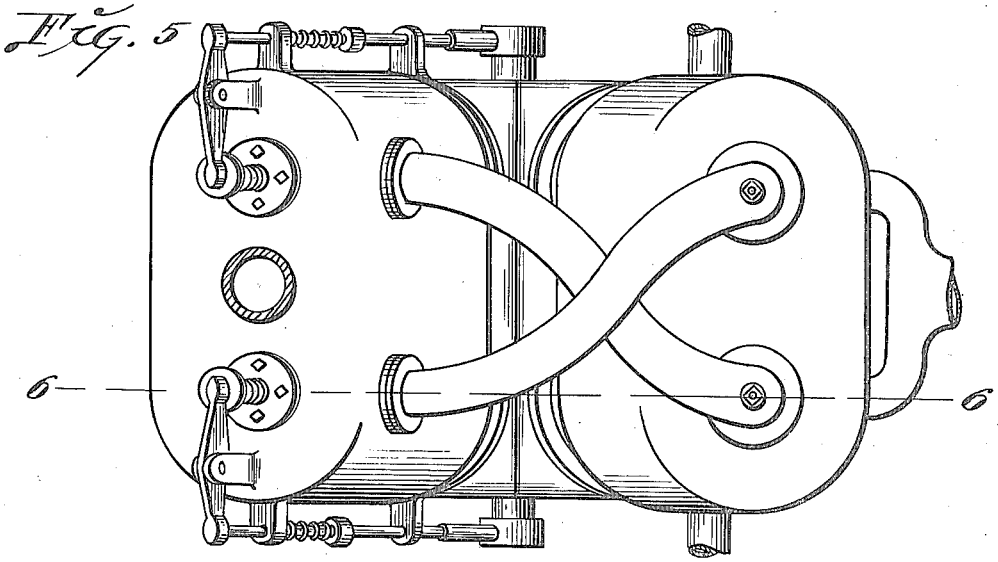
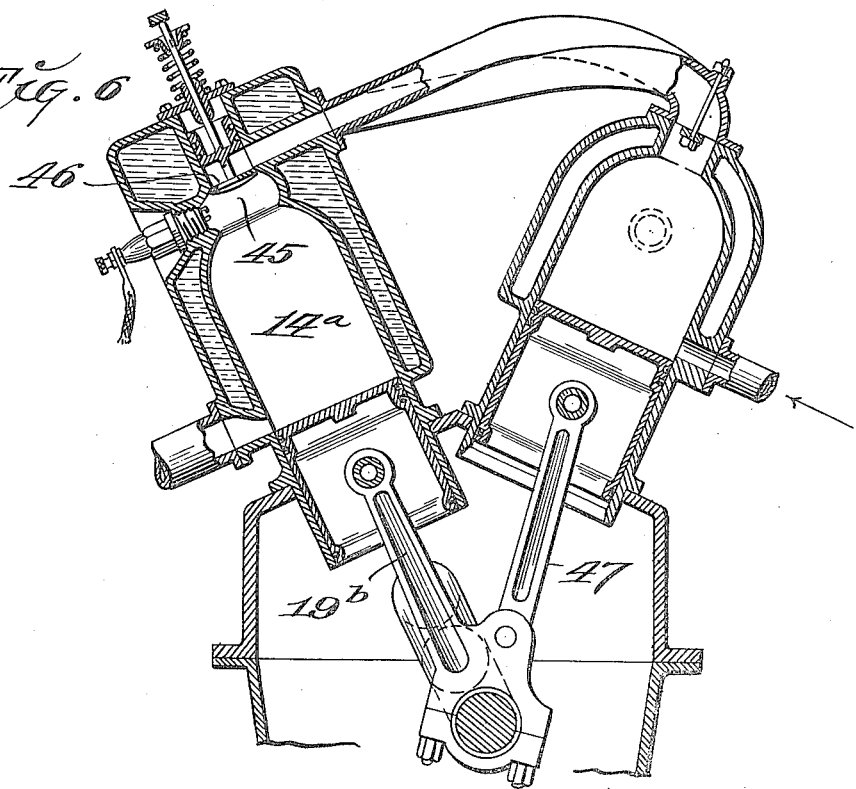

1,511,705

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

INTERNAL-COMBUSTION ENGINE.

Application filed January 4, 1923. Serial No. 610,698.

*To all whom it may concern:*

Be it known that I, EVERETT R. BURTNETT, a citizen of the United States, residing at Los Angeles, in the county of Los Angeles, State of California, have invented new and useful Improvements in Internal-Combustion Engines, of which the following is a specification.

My invention relates to internal combustion engines, of the two stroke cycle type, the principal objects of my invention being to generally improve upon and simplify the construction of the existing form of two cycle engines and to provide an engine operating on two stroke cycle principle that develops the same number of power impulses per crank shaft revolution for a given number of cylinders and which employs only half the number of valves required to function the conventional four stroke cycle engine.

A further object of my invention to provide an engine of the character referred to that has its cylinder blocks arranged V-form with the firing cylinders or combustion chambers arranged in one leg and the gaseous fuel compression cylinders in the other leg, and which arrangement permits the two rows of cylinders to be disposed in two different planes of any desired angularity relative to each other, without disarranging the time period between combustion occasions or power impulses within the firing cylinders. The forming of the firing cylinders in one row and the compression cylinders in another row, enables the compression cylinder to be arranged at any desired angle relative to the firing cylinder, provides for a maximum compression of the gaseous fuel within the precompression chamber at any desired time after the piston of the combustion chamber to which the precompressed gaseous fuel has been pumped, has passed lower or outer crank dead center and consequently maintaining a maximum compression of the inductive charge at the time of induction by transfer from one cylinder to the other until the induction valve closes.

Further objects of my invention are to provide an internal combustion engine of the character referred to that has a relatively short overall length, is comparatively light in weight, has a perfect mechanical balance, and which is capable of being produced with low manufacturing cost.

Further objects of the invention are to provide a positive induction two stroke cycle internal combustion engine, to eliminate the cam shaft, cam shaft bearings, timing gears and like parts usually formed in conventional four cycle engines, to provide a positively actuated valve for the induction of the precompressed gaseous charge, to provide for the admission of the compressed charge at the end of the combustion chamber opposite to the end from which the spent charge of residual products of combustion is expelled, to provide a construction wherein a minimum charge volume admitted to the combustion chamber will remain in stratified relation with the cylinder content of residual products of combustion remaining in the cylinder after the close of the exhaust port and to provide an engine in which regular firing or ignition of the compressed gaseous charge will be obtained at all degrees of throttle.

Further objects of the invention are to provide a two stroke cycle internal combustion engine having only one poppet valve to each cylinder, to provide means for actuating said valve directly from a cam that is a part of the crank shaft of the engine, to eliminate the poppet type exhaust valves and their attendant disadvantages, viz, overheating, warping and pitting and further to provide an engine having supercharging precompressing cylinders that are surrounded by cells through which may be circulated the hot spent residual products of combustion after the same have expanded and been expelled from the combustion chambers, thus thoroughly preheating the gaseous fuel and converting the same into practically dry vapor before it is inducted into the combustion chambers.

With the foregoing and other objects in view, my invention consists in certain novel features of construction and arrangement of parts that will be hereinafter more fully described and claimed and illustrated in the accompanying drawings in which:

Fig. 1 is a vertical section taken transversely through an engine of my improved construction and showing the arrangement of the combustion and precompression cylinders.

Fig. 2 is a vertical section similar to Fig. 1 and showing the valves and their mechanisms.

Fig. 3 is a horizontal section taken on the line 3—3 of Fig. 2.

Fig. 4 is a horizontal section taken on the line 4—4 of Fig. 2.

Fig. 5 is a plan view of a modified form of my improved engine.

Fig. 6 is a vertical section taken on the line 6—6 of Fig. 5.

Referring by numerals to the accompanying drawings which illustrate a practical embodiment of my invention, 10 and 11 designate respectively the upper and lower parts of a crank case and arranged in the end walls thereof are suitable bearings for a combined crank and cam shaft 12.

Mounted in the upper portion of the upper member 10 of this crank case is a cylinder block 13 having formed therein a pair or a plurality of pairs of combustion chambers such as 14, and this block is disposed so that it occupies an angle of approximately 25 degrees, relative to a vertical plane.

Mounted in the opposite side of the upper portion of member 10, is a cylinder block 15 that occupies an angular position of approximately 50 degrees relative to the axes of the cylinders 13 and formed in said block 15 is a pair or a plurality of pairs of gaseous fuel compression chambers 16.

The walls of block 13 that surround the upper portion of the chambers 14 are provided with communicating cells 17, through which may be circulated a suitable fluid cooling medium such as water and likewise the walls of block 15 that surround the upper portions of the chambers 16 are formed with communicating cells 18 through which may circulate the highly heated burnt products of combustion that discharge from combustion chambers 14.

In my improved engine, there may be two or any multiple of two combustion chambers 14 and there must be a corresponding number of compression chambers 16.

For convenience and simplicity of structure, I prefer to arrange the blocks 13 and 15 so that the chambers 14 and 16 therein, are in transverse alignment.

Arranged for reciprocatory movement within each combustion chamber 14 is a power piston 19 that is connected in the usual manner by a connecting rod 19ª to the corresponding crank on shaft 12.

Gaseous fuel compression pistons such as 20 are arranged for reciprocatory movement in the chambers 16 and each of these pistons is connected in the usual manner by a connecting rod 21 to the corresponding crank or shaft 12.

Thus, by virtue of the relative positions of the chambers 14 and 16, the connecting rods of the pistons in the members of a transversely disposed pair of said chambers, are connected at their lower ends to the same crank on shaft 12.

Extending laterally from the upper portion of each combustion chamber 14 is an ignition chamber 22 into which project the inner ends of the electrodes of a spark plug 23 and leading from the exterior of the block 13 through the wall thereof and communicating with the bottom of said ignition chamber, through a port 24 is a precompressed gaseous fuel inlet duct 25. Port 24 is normally closed by an upwardly opening poppet valve 26, the stem 27 of which, has associated therewith, a compression spring 28, that tends to retain said valve upon its seat.

Operating through a bearing 29 in the top of member 10, is a spring held push rod 30, the upper end of which bears directly against the lower end of valve stem 27 and the lower end bearing on the periphery of a cam 31 that is formed on shaft 12.

The lobe of this cam is approximately 180 degrees in length.

The walls surrounding the ignition chamber 22 and duct 25 are provided with cells 17ª that communicate directly with the cells 17.

Formed through the wall of block 13 and at an intermediate point in the length of chamber 14 is an exhaust port 32, the position of which is such that it is fully uncovered and open, only when piston 19 is at the lower end of its stroke.

A suitable duct 33 leads from this exhaust port to the cells or chambers 18 in block 15.

Formed in the upper portion of block 15 and extending laterally from the upper portion of each compression chamber 16, is a chamber 34 and leading to the outer portion thereof and communicating therewith through a port 35, is a gaseous fuel inlet duct 36 and which latter is connected by a pipe or conduit 37, to a suitable source of gaseous fuel supply, preferably a carburetor.

Port 35 is normally closed by a poppet valve 38, the stem 39, of which has associated therewith, a compression spring 40 that tends to retain said valve upon its seat.

Operating through a bearing 41 in the top of member 10 is a spring held push rod 42, the upper end thereof bearing against the lower end of valve stem 39 and its lower end bearing on the periphery of a cam 43 that is formed on shaft 12. The lobe of this cam 43 is relatively short.

Leading from the chambers 34 of each pair of cylinders 15 to the inlet ducts 25 of the members 13 are compressed gaseous fuel ducts 44 the members of each pair crossing each other at a point between the two sets of cylinders.

By virtue of this arrangement, the gaseous fuel compressed in each chamber 16 is transferred through the respective duct 44, to the diagonally opposite one of the chambers 14 and which is necessary, owing to the arrangement of the cranks of shaft 12.

In this connection, it will be understood that the cranks on this shaft are 180 degrees apart, so that when the members 19 and 20 of one pair of pistons are at their top centers, the members of the adjacent pair are at their low centers.

The operation of my improved engine is as follows: As each power piston 19 passes high center, a spark is produced at the inner end of the corresponding plug 23, thereby igniting the charge of compressed gaseous fuel within the ignition chamber 22 and upper portion of chamber 14 and the power of the expansion resulting from this combustion will be directed against the head of said piston 19 to drive the same downward on its power stroke.

As piston 19 reaches the lower end of its stroke, exhaust port 32 will be fully opened for an instant, thereby permitting the burnt products of combustion to discharge through said port and pass through duct 33 to cell or chamber 18, thereby thoroughly heating the upper portion of the gaseous fuel compression chamber.

While power piston 19 is thus moving downward, the piston in the companion or diagonally opposite compression chamber is moving upwardly, to compress, in the upper portion of said chamber and the corresponding transfer duct 44, a charge of gaseous fuel.

At the time interval, cam 31 is effective in opening valve 22, to admit this charge of precompressed and preheated gaseous fuel into ignition chamber 22 and combustion chamber 14 and on the upward stroke of piston 19, said charge together with the residual products of combustion will be compressed within the upper portion of said chamber 14 and the ignition chamber 22.

Inasmuch as this charge of gaseous fuel is inducted into and passes through the ignition chamber 22 before entering the combustion chamber, the combined charge of gaseous fuel and residual products of combustion, will be stratified within said chambers, and with the volume of gaseous fuel practically filling the ignition chamber. As a result, perfect combustion of gaseous fuel will take place, when the spark is produced at the inner ends of the electrodes of the spark plug, and which latter, it will be understood, projects into the chamber in which the gaseous fuel volume is compressed.

On the downward stroke of the compression piston 20, a partial vacuum is produced with chamber 16 and as said piston approaches low center, cam 43 acts through push rod 42 to open valve 38, thereby permitting a charge of gaseous fuel to pass from supply pipe 37, through duct 36, port 35 and chamber 34, into the compression chamber.

This incoming charge of fuel will be highly heated and vaporized as a result of the absorption of heat from the walls surrounding the upper portion of the compression chamber, and which walls are heated by the products of combustion passing through the cells or chambers 18.

On the succeeding upward stroke of piston 20, the gaseous fuel charge drawn into the compression chamber will be compressed therein, and at the proper instant, or when valve 24 is opened, this compressed charge will pass through transfer duct 40, to the diagonally opposite combustion chamber, to be further compressed therein, as the power piston moves upwardly on its compression stroke.

In the modified construction illustrated in Figs. 5 and 6, the combustion chamber 14$^a$, instead of having a laterally disposed ignition chamber, communicates at its upper end with an axially arranged ignition chamber 45, the inlet opening into which is normally closed by a poppet valve 46 that is actuated by suitable mechanism from the crank shaft.

Further, in this modified structure, the piston rod 47 that is connected to piston 20$^a$ in the precompression chamber is connected at its lower end to the lower portion of the connecting rod 19$^b$ that depends from the corresponding or companion piston.

Thus it will be seen that I have provided a two stroke internal combustion engine that is of relatively simple structure, very compact, of relatively short overall length, capable of being produced at low manufacturing cost, and which will produce a relatively high degree of power with minimum fuel consumption.

It will be understood that minor changes in the size form and construction of the various parts of my improved engine may be made, and substituted for those herein shown and described without departing from the spirit of the invention as set forth in the appended claims.

I claim—

1. In a two stroke cycle internal combustion engine, a pair of combustion cylinders, a pair of gaseous fuel pumping cylinders, the chambers within all four cylinders being provided adjacent to their upper or inner ends with lateral extensions, a gaseous fuel supply duct leading to the lateral extension of the chamber within each pumping cylinder, valves for controlling the passage of gaseous fuel through the lateral extensions of the chambers within the pumping cylinders, precompressed gaseous fuel transfer ducts leading from the lateral extensions of the chambers within the pumping cylinders to the lateral extensions of the chambers within the combustion cylinders, valves for controlling passage of precompressed gaseous fuel through the lateral extensions of the chambers within the combustion cylinders, the lower portions of the combustion cylinders being provided with exhaust ports that are uncovered and open when the pistons within said combustion chambers are at the lower ends of their travel.

2. In a two stroke cycle internal combustion engine, a pair of combustion cylinders, a pair of gaseous fuel pumping cylinders, the chambers within all four cylinders being provided adjacent to their upper or inner ends with lateral extensions, a gaseous fuel supply duct leading to the lateral extension of the chamber within each pumping cylinder, valves for controlling the passage of gaseous fuel through the lateral extensions of the chambers within the pumping cylinders, precompressed gaseous fuel transfer ducts leading from the lateral extensions of the chambers within the pumping cylinders to the lateral extensions of the chambers within the combustion cylinders, valves for controlling passage of precompressed gaseous fuel through the lateral extensions of the chambers within the combustion cylinders, the lower portions of the combustion cylinders being provided with exhaust ports that are uncovered and open when the pistons within said combustion chambers are at the lower ends of their travel, ignition means in the lateral extensions of the chambers within the combustion cylinders, a crank shaft having two cranks, and pistons arranged within the four cylinders, which pistons are connected to the two cranks of said crank shaft.

In testimony whereof I have signed my name to this specification.

EVERETT R. BURTNETT.